US005376425A

United States Patent [19]

Asano et al.

[11] Patent Number: 5,376,425

[45] Date of Patent: Dec. 27, 1994

[54] CONTACT MEMBER FOR CONTROLLING AN ELECTROSTATIC STATE OF A CHARGEABLE MEMBER

[75] Inventors: Masaki Asano, Amagasaki; Shuji Iino, Hirakata; Akihito Ikegawa, Sakai; Izumi Osawa, Ikeda; Kenzo Tanaka, Ikoma, all of Japan

[73] Assignees: Minolta Camera Kabushiki Kaisha, Osaka; Toeisangyo Co., Ltd., Ikoma, both of Japan

[21] Appl. No.: 992,107

[22] Filed: Dec. 17, 1992

[30] Foreign Application Priority Data

Dec. 20, 1991 [JP] Japan ................................ 3-338980

[51] Int. Cl.$^5$ ................................ B32B 3/02

[52] U.S. Cl. ................................ 428/96; 428/87; 428/95; 428/97; 428/225; 428/244; 428/245; 428/375; 428/393; 428/920; 428/921; 428/323; 361/221; 361/225

[58] Field of Search ............... 428/920, 921, 393, 375, 428/368, 323, 206, 87, 95, 96, 97, 244, 245, 295, 396, 225; 355/301, 303; 361/221, 225; 57/904

[56] References Cited

U.S. PATENT DOCUMENTS

| | | | |
|---|---|---|---|
| 3,582,444 | 6/1971 | Ngo et al. | 161/65 |
| 3,583,938 | 6/1971 | Okada et al. | 260/45.9 R |
| 4,154,890 | 5/1979 | Wagner | 428/276 |
| 4,246,306 | 1/1981 | Payne et al. | 428/36 |
| 4,375,493 | 3/1983 | George et al. | 428/246 |
| 4,455,078 | 6/1984 | Mukai et al. | 361/221 |
| 4,456,648 | 6/1984 | Adamse et al. | 428/283 |
| 4,750,018 | 6/1988 | Gooray et al. | 355/271 |
| 4,761,709 | 8/1988 | Ewing et al. | 361/225 |
| 5,183,594 | 2/1993 | Yoshinaka et al. | 252/518 |
| 5,270,106 | 12/1993 | Orlowski et al. | 428/295 |
| 5,284,701 | 2/1994 | Hamon | 428/246 |

*Primary Examiner*—Patrick J. Ryan
*Assistant Examiner*—Marie R. Macholl
*Attorney, Agent, or Firm*—Burns, Doane, Swecker & Mathis

[57] ABSTRACT

A contact member for controlling an electrostatic state of a surface of a chargeable member includes electrically conductive base members, and flame retardant material included in the base members.

10 Claims, 2 Drawing Sheets

CONTACT MEMBER FOR CONTROLLING AN ELECTROSTATIC STATE OF A CHARGEABLE MEMBER

BACKGROUND OF THE INVENTION

1. Field of the Invention

The present invention relates to a contact member for controlling an electrostatic state of a member to be charged or discharged, and in particular, to a charging brush for charging a surface of an electrostatic latent image carrier such as a photosensitive drum in an image forming apparatus such as a copying machine and a printer, and specifically, also relates to a discharging brush for removing a residual charge on the electrostatic latent image carrier with contacting the carrier to discharge the residual charge.

2. Description of the Background Art

The contact member such as the charging brush and the discharging brush is usually formed of a group of brush hairs contacting the surface of the electrostatic latent image carrier. The contact member charges the surface of the carrier at an intended potential by applying a charging voltage to the brush hairs, or removes a residual charge on the carrier.

Particularly, the contact member such as the charging brush and the discharging brush, which includes cellulosic fibers such as rayon fibers as a major component, has attracted the attention, because of its good creep property, facility in adjustment of an electric resistance and others.

However, if the brush hair (e.g., electrically conductive rayon brush hair) comprising the cellulosic fiber(s) and conductive material such as carbon black dispersed therein is used, the fiber may contact a conductive substrate or base member of an image carrier, which is maintained at a ground potential and is exposed through a pin hole in the surface of the image carrier, in which case an excessively large current flows through the fiber, so that the hair catches fire, and the fire spreads to other hairs. The spread of fire is due to the fact that the cellulosic fiber has high flammability and burnability.

Accordingly, it is an object of the invention to provide a contact member for controlling an electrostatic state of a member to be charged or discharged without the above mentioned problems.

It is another object of the invention to provide a contact member such as a charging brush and a discharging brush in an image forming apparatus, which can prevent inflammation and spread of fire of brush hairs, which may be caused by an abnormal current flowing though a pin-hole or the like in an electrostatic latent image carrier.

It is still another object of the invention to provide an improvement of a contact member including cellulosic high polymer fiber as a major material which is liable to generate heat and inflame due to the flow of current, and more particularly, an improvement of a contact member in the form of a brush having a small volume and a small heat capacity, conversely to a brush of a roller type.

SUMMARY OF THE INVENTION

The present invention provides a contact member for controlling an electrostatic state of a surface of a chargeable member, i.e., a member to be charged or discharged, including electrically conductive base members, and flame retardant material kept by said base members. The contact member may be charging brushes of various forms for charging an image carrier of an image forming apparatus, and also may be discharging brushes. The brush may be of a fixed type and a rotatable roller type. The brush may be formed of a high polymer fiber(s), e.g., made from cellulosic high polymer material, and a flameproofing treatment using flame retardant material may be applied to it.

The high polymer fibers may be selected from a group including rayon, nylon, acetate, cuprammonium, vinylidene, vinylon, ethylene fluoride, promix, benzoate, polyurethane, polyester, polyethylene, polyvinyl chloride, polychlal, polynosic and polypropylene, in which resistance adjusting agent such as carbon black, carbon fiber, metal powder, metal whiskers, metal oxide, semiconductor and others is dispersed.

Following flame retardant materials may be used for the flameproofing treatment.

The flame retardant materials which can be used in the invention may be classified into several types containing bromine, phosphorus, chlorine and inorganic substance, respectively. Preferably, the flame retardant material is at least one compound selected from a group consisting of bromine compound, phosphorus compound, chlorine compound and inorganic substance. The flame retardant material included in the base members is contained in the base members and/or covers the base members.

The flame retardant material containing bromine may be tetrabromobisphenol A (TBA), decabromodiphenyl oxide (DBDPO), hexabromocyclododecane, octabromodiphenyl ether, tetrabromodiphenyl ether, polydibromophenylene oxide, bistribromophenoxy ethane, tribromophenol, ethylene bistetrabromophthalimide, pentabromobenzyl polyacrylate or others.

The flame retardant material containing phosphorus may be material containing phosphate, halogen-containing phosphate, polyphosphoric acid salt, red phosphorus or others.

The flame retardant material containing chlorine may be chlorinated paraffin, perchlorocyclopentadecane, tetrachlorophthalic anhydride, chlorendic acid or others.

The inorganic flame retardant material may be material containing antimony trioxide, aluminium hydroxide, zinc borate, guanidine nitride, antimonypentoxide, magnesium hydroxide, zirconium compound or others.

Mechanisms for exhibiting the flame resistance differ in respective kinds of materials. For example, if aluminium hydroxide or magnesium hydroxide is used, desorption of water of crystallization causes an endothermic reaction, which suppresses inflammation. If antimony oxide or other material containing halogen is used, inflammation generates inert gas, which improves the flaming resistance. If material containing phosphorus is used, the phosphorus compound generates acid. In the course of formation of polymetaphosphoric acid, dehydration promotes carbonization, and generation of non-volatile phosphorus oxide achieves the effect.

The flame retardant materials described above can be used for improving the flame resistance of the contact member.

In the invention, if the contact member has a brush form and includes high polymer fibers, the flame retardant material may added to the high polymer fibers, and agents such as softening agent, lubricating agent, agent for improving a tear strength, agent for improving a sewing property, shrink resistant agent, water repellent agent, and/or oil repellent agent may be also added thereto. These agents or additives serve as softening agent or lubricating agent, depending on the types of the high polymer fibers, and may be dry silica, wet silica, graphite, metal filler, metal whisker, carbon fiber or fluorine-contained resin.

According to the contact member such as a charging brush and a discharging brush, a group of brush hairs of the brush contacts the surface of a member to be charged or discharged such as an electrostatic latent image carrier and receives a charging voltage to charge the surface of the chargeable member, or discharges the surface of the member, which is similar to an operation in the prior art.

Even if there is a pin-hole in the surface of the member to be charged or discharged, which the brush hairs contact and thus an abnormal current flows therethrough, inflammation of the brush hairs and spread of fire are prevented because the flameproofing treatment has been applied to the brush hairs.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
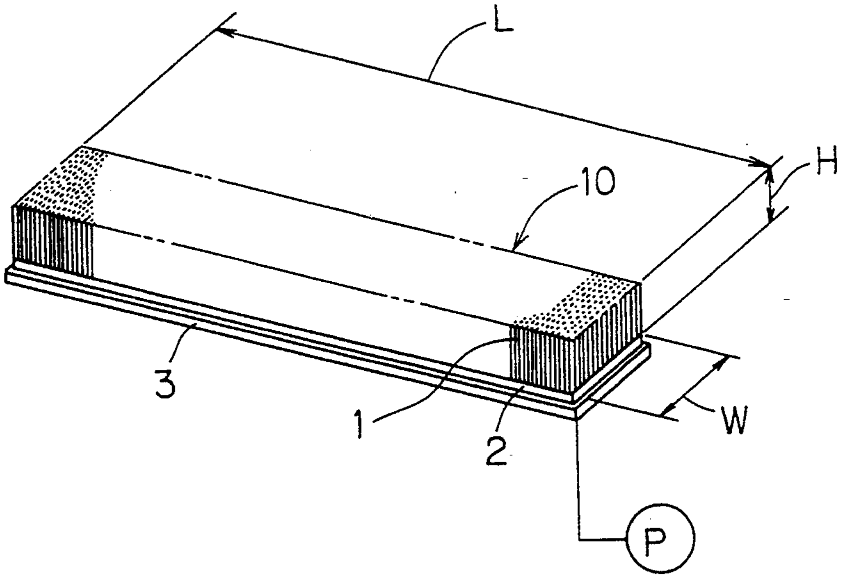
FIG. 1 is a perspective view showing an embodiment of the invention.
Figure 2:
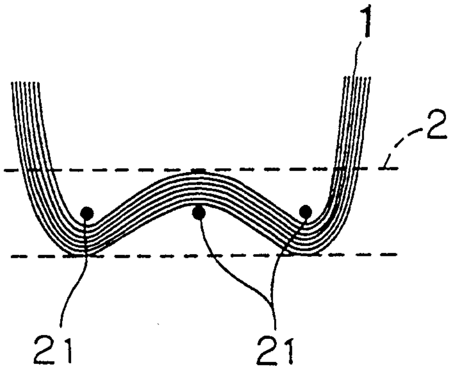
FIG. 2 is a schematic view showing a manner for weaving brush hairs into a base fabric.

Referring to FIG. 1, a charging brush is shown, which includes electrically conductive rayon fibers 1 (brush hairs) of 6 deniers. Each brush hair is formed of fiber 1. The rayon fiber 1 contains conductive carbon powder at 18 wt. % with respect to the whole weight. Bundles, each including 100 fibers, are woven in a W-form into warps 21 of a base cloth 2, as shown in FIG. 2, whereby pile fabric is formed. The pile fabric is cut to form a brush hair portion 10. The brush portion 10 is subjected to the flameproofing treatment. Then, a rear surface of the base cloth 2 is coated with electrically conductive adhesive, by which the base cloth 2 is fixed to a base 3. In a charging operation, a charging voltage, e.g., between +500V and ±3KV is applied from a power source P to the brush portion 10 through the base 3.

The base 3 is made of an aluminium plate of 1 mm in thickness. The brush hair portion has a length L of 240 mm, a width W of 8 mm and a height H of 5 mm. The density of brush hairs is 155 hairs/$mm^2$.

The flameproofing treatment for the brush hair portion 10 is carried out in the following manner.

(1) Liquid of 5 liters is formed by adding water to "Frame Guard 5518conc." (flame retardant material, manufactured by Dainippon Ink Kagaku Kogyo Kabushiki Kaisha) of 200 g, resin obtained by condensation reaction "Bekkamin J-101" (melamine resin, manufactured by Dainippon Ink Kagaku Kogyo Kabushiki Kaisha) of 50 g, "MegaFac F-833" (penetrant material, manufactured by Dainippon Ink Kagaku Kogyo Kabushiki Kaisha) of 3 g for promoting penetration into fibers, and ammonium chloride (curing catalyzer) of 4 g.

(2) The brush hair portion 10 is immersed in this liquid for ten seconds and then is removed therefrom.

(3) The brush hair portion 10 is pre-dried at 130° C. for ten minutes, and then is subjected to the baking at 160° C. for four minutes.

(4) The brush hair portion 10 is washed with aqueous sodium carbonate to neutralize the residual phosphoric acid. Subsequently, the portion 10 is rinsed and dried.

The brush hair portion 10, to which the foregoing flameproofing treatment has been applied, is fixed to the base 3, as described before.

The flame retardant material "Frame Guard 5518" is N-methylol phosphonate compound having a following structural formula.

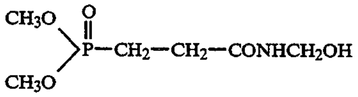

The charging brush thus manufactured has a self-extinguishing property. In an experiment, the charging brush hairs were exposed to flames. When the flames were moved away therefrom, the flames of hairs were immediately extinguished and the hairs did not burn any longer. In another experiment, the brush hairs were heated and burned by flowing the current therethrough at a rate of 200 μA or more per one brush hair. However, the fire did not spread from the brush hairs through which the current flowed.

According to the image forming apparatus provided with the charging brush described above, the electrostatic latent image carrier such as a photosensitive member may have the defect such as a pin-hole and thus the brush hair may directly contact the conductive substrate or base member at the ground potential. In other words, the short circuit may be formed and an excessively large current may flow through the brush hair. Even in this case, the brush hair other than that contacting the substrate do not burn.

Another embodiment of the invention will be described below. This embodiment has the same structures and sizes as the embodiment described before except for the flameproofing treatment, which is carried out in the following manner.

(1) "Frame Guard 5316-S" (flame retardant material, manufactured by Dainippon Ink Kagaku Kogyo Kabushiki Kaisha) of 300 g is dissolved into water of 700 g.

(2) The brush hair portion 10 is immersed in this liquid for ten minutes and then is removed therefrom.

(3) The brush hair portion 10 is dried at 100° C. for ten minutes.

The brush hair portion 10 to which the foregoing flameproofing treatment has been applied, is fixed to the base 3.

The flame retardant material "Frame Guard 5316-S" is compound containing organic phosphorus and nitrogen, and more specifically, is condensed phosphoric acid alkyl ester ammonium salt and dicyandiamidecondensate having a following structural formula.

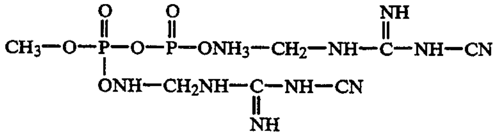

The charging brush thus manufactured has a self-extinguishing property. In an experiment, the charging brush hairs were exposed to flames. When the flames were moved away therefrom, the flames of hairs were immediately extinguished and the hairs did not burn any longer. In another experiment, the brush hairs were heated and burned by flowing the current therethrough at a rate of 200 μA or more per One brush hair. However, the fire did not spread from the brush hairs through which the current flowed.

According to the image forming apparatus provided with the charging brush described above, the electrostatic latent image carrier such as a photosensitive member may have defect such as a pin-hole and thus the brush hair may directly contact the conductive substrate at the ground potential. Even in this case, the brush hair other than that contacting the substrate do not burn.

As an example for comparison, a charging brush, which had the same structures and sizes as those of the embodiment and was not subjected to the flameproofing treatment, was prepared. Since this brush does not have a self-extinguishing property, the brush exposed to the flames burned even after the flames were moved away from the brush, and the spread of fire was found.

The brush hairs were heated and burned by flowing the current therethrough at a rate of 200 μA or more per one brush hair. Also in this case, the spread of fire was found.

According to the image forming apparatus provided with the charging brush of this example for comparison, when the electrostatic latent image carrier has the defect such as a pinhole and thus the brush hair directly contacts the electrically conductive substrate at the ground potential, the brush hairs other than that contacting the substrate burns. Therefore, this brush cannot be used as the charging brush.

The present invention can employ any known power source, which has been used for the contact charging operation, such as a DC constant-voltage source, AC constant-voltage source, DC constant-current source or AC constant-current source. If the invention is combined with the constant-voltage source, which is liable to cause the excessively large current due to the defect such as a pin-hole, the invention can effectively and preferably compensate the disadvantage of the constant-voltage source.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contact device capable of controlling an electrostatic state of a surface of a chargeable member used in an image forming apparatus, comprising:

an electrically conductive base member, a base cloth fixed to the base member and including flame retardant material selected from the group consisting of a bromine compound, phosphorus compound, chlorine compound and inorganic substance; and an electrically conductive brush member including polymer material, resistance adjusting agent and flame retardant material selected from the group consisting of a bromine compound, phosphorus compound, chlorine compound and inorganic substance, said brush member woven in the base cloth.

2. A contact device according to claim 1, wherein said base cloth is fixed to the base member by an electrically conductive adhesive.

3. A contact device according to claim 1, wherein said phosphorus compound has a structure expressed by a following formula I or II:

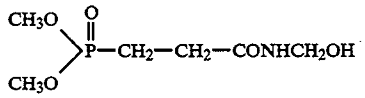
[I]

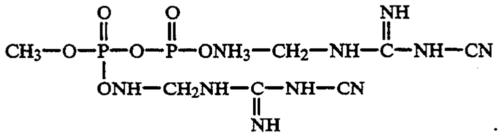
[II]

4. A contact device according to claim 1, wherein said resistance adjusting agent is carbon black.

5. A contact device according to claim 1, wherein said brush member is cellulosic fibers including the resistance adjusting agent and the flame retardant material.

6. A contact device according to claim 1, which is a charging device for charging the surface of the chargeable member.

7. A contact device according to claim 6, wherein said chargeable member is an electrostatic latent image carrier.

8. A contact device according to claim 6, wherein said base member is charged by an applied charging voltage.

9. A contact device according to claim 8, wherein said charging voltage is a constant voltage.

10. A contact device according to claim 1, which is a discharging device for removing a residual charge of the chargeable member.

* * * * *